US011312037B2

(12) United States Patent
Owens

(10) Patent No.: US 11,312,037 B2
(45) Date of Patent: Apr. 26, 2022

(54) MITER FENCE POSITIONER

(71) Applicant: Timothy Owens, Perrysburg, OH (US)

(72) Inventor: Timothy Owens, Perrysburg, OH (US)

( * ) Notice: Subject to any disclaimer, the term of this patent is extended or adjusted under 35 U.S.C. 154(b) by 0 days.

(21) Appl. No.: 17/115,315

(22) Filed: Dec. 8, 2020

(65) Prior Publication Data

US 2021/0170622 A1    Jun. 10, 2021

Related U.S. Application Data

(60) Provisional application No. 62/945,307, filed on Dec. 9, 2019.

(51) Int. Cl.
    *B27B 27/02*    (2006.01)
    *B27B 27/10*    (2006.01)
    *B27B 27/04*    (2006.01)

(52) U.S. Cl.
    CPC .............. *B27B 27/02* (2013.01); *B27B 27/10* (2013.01); *B27B 27/04* (2013.01)

(58) Field of Classification Search
    CPC ... Y10T 83/858; Y10T 83/7647; Y10T 83/76; B27B 27/04; B27B 27/02; B27B 27/06; B27B 27/10
    USPC .......................................... 83/522.19, 522.21
    See application file for complete search history.

(56) References Cited

U.S. PATENT DOCUMENTS

| | | | | |
|---|---|---|---|---|
| 3,329,181 A | * | 7/1967 | Buss ........................ | B27B 1/007 83/365 |
| 4,982,509 A | * | 1/1991 | Luttmer .................... | G01B 7/02 D10/70 |
| 5,327,653 A | * | 7/1994 | Pistorius ................. | G01D 5/145 33/708 |
| 5,524,514 A | * | 6/1996 | Hadaway ............... | B23D 47/02 269/303 |
| 6,216,574 B1 | * | 4/2001 | Hain ........................ | B23Q 1/28 83/241 |
| 7,073,268 B1 | | 7/2006 | Etter et al. | |
| 7,464,737 B2 | | 12/2008 | Duginske | |
| 7,483,765 B2 | * | 1/2009 | Dick ....................... | B27B 27/02 700/186 |

(Continued)

FOREIGN PATENT DOCUMENTS

| | | |
|---|---|---|
| DE | 10124654 A1 | 11/2002 |
| DE | 202012010829 U1 | 11/2012 |
| WO | 2011021189 A1 | 2/2011 |

*Primary Examiner* — Laura M Lee

(74) *Attorney, Agent, or Firm* — Shumaker, Loop & Kendrick, LLP; James D. Miller

(57) ABSTRACT

A miter saw assembly includes a cutting tool configured to perform a cut along a cutting axis. A stop mechanism is linearly translatable in a first direction. A rotary motor includes a selectively rotatable rotor and a motion conversion mechanism configured to transform rotary motion of the rotor to linear motion of the stop mechanism in the first direction. A controller is configured to selectively rotate the rotor to cause linear translation of the stop mechanism toward or away from the cutting axis. A position detection system includes a visual sensor coupled to the stop mechanism and a ruler strip. The ruler strip includes a plurality of spaced apart position indicators configured for detection by the visual sensor in order to determine a position of the stop mechanism relative to the cutting axis of the cutting tool via position correlating perform by the controller.

14 Claims, 5 Drawing Sheets

(56) References Cited

U.S. PATENT DOCUMENTS

| | | | | |
|---|---|---|---|---|
| 7,614,330 B2* | 11/2009 | Griswold | ............... | B23Q 3/007 |
| | | | | 33/706 |
| 7,882,772 B2* | 2/2011 | Wise | ....................... | B27B 27/10 |
| | | | | 83/468.2 |
| 8,093,842 B2* | 1/2012 | Bergeron | ............. | G05B 19/291 |
| | | | | 318/135 |
| 8,783,140 B2* | 7/2014 | Dick | ....................... | B27B 31/06 |
| | | | | 83/13 |
| 9,810,524 B2 | 11/2017 | Reese et al. | | |
| 2002/0157515 A1* | 10/2002 | Dick | ....................... | B27B 27/10 |
| | | | | 83/438 |
| 2006/0065087 A1* | 3/2006 | Griswold | ............... | B23Q 3/007 |
| | | | | 83/13 |
| 2006/0174502 A1 | 8/2006 | Crane | | |
| 2008/0009961 A1* | 1/2008 | Dick | ....................... | B27B 27/02 |
| | | | | 700/167 |
| 2010/0071521 A1 | 3/2010 | Hadaway et al. | | |
| 2011/0056344 A1* | 3/2011 | Dick | ....................... | B27B 31/06 |
| | | | | 83/13 |
| 2020/0023542 A1* | 1/2020 | Owens | .................... | B27B 27/06 |
| 2021/0170622 A1* | 6/2021 | Owens | .................... | B27B 27/02 |

\* cited by examiner

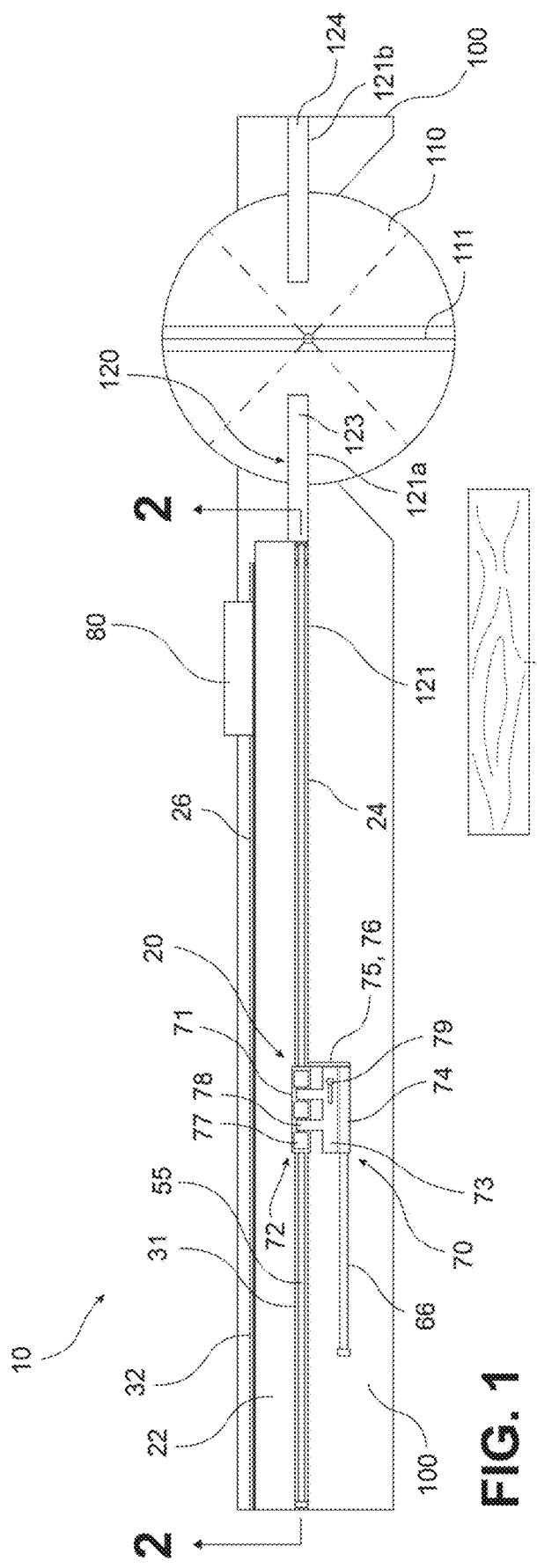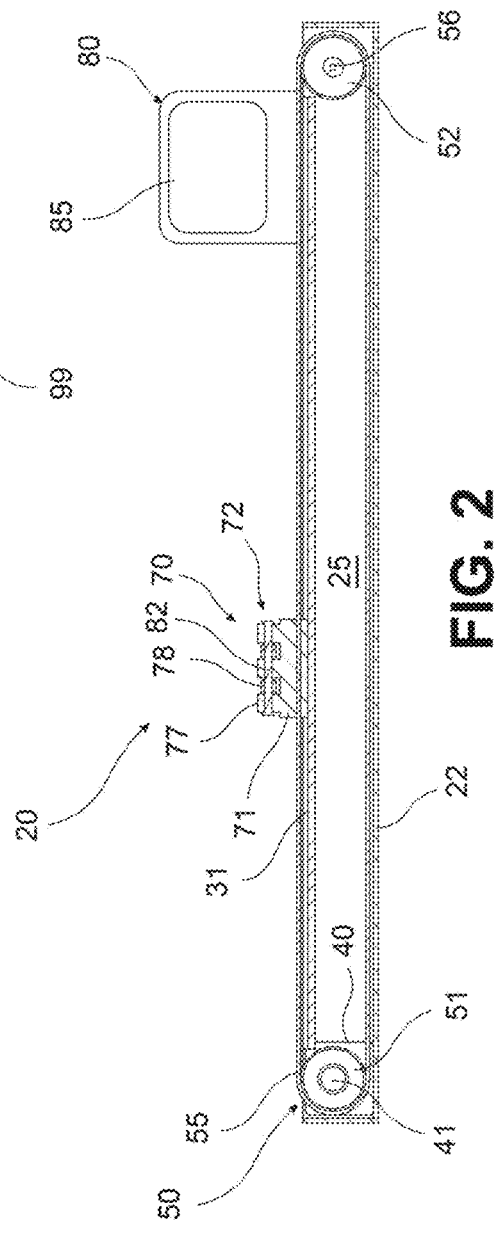

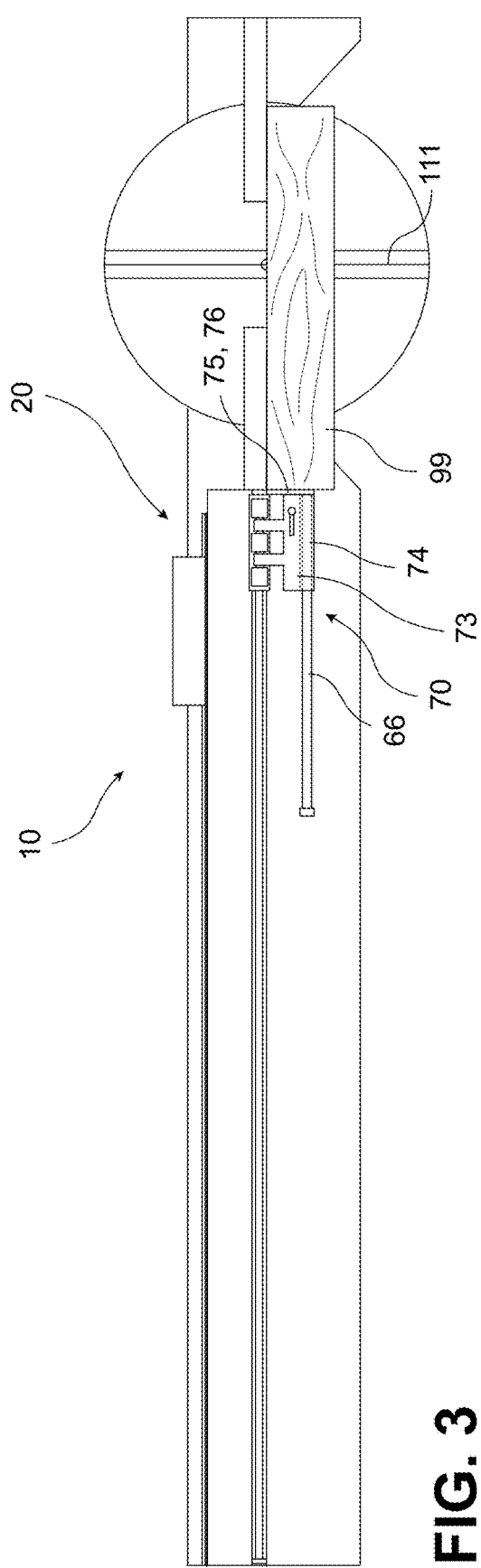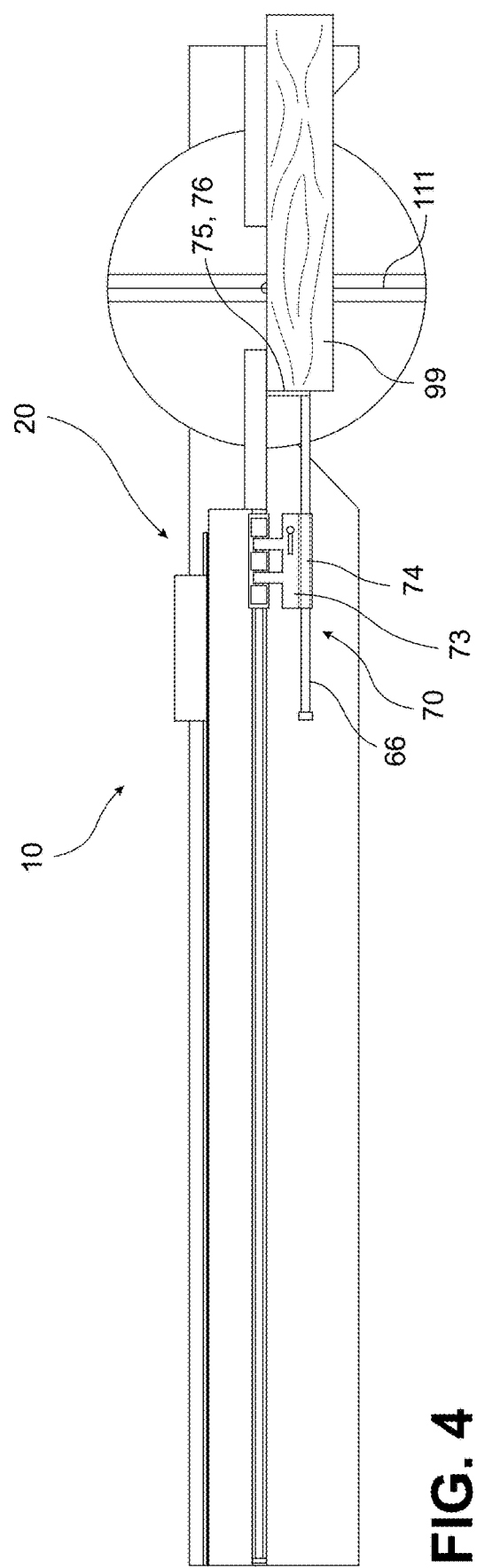

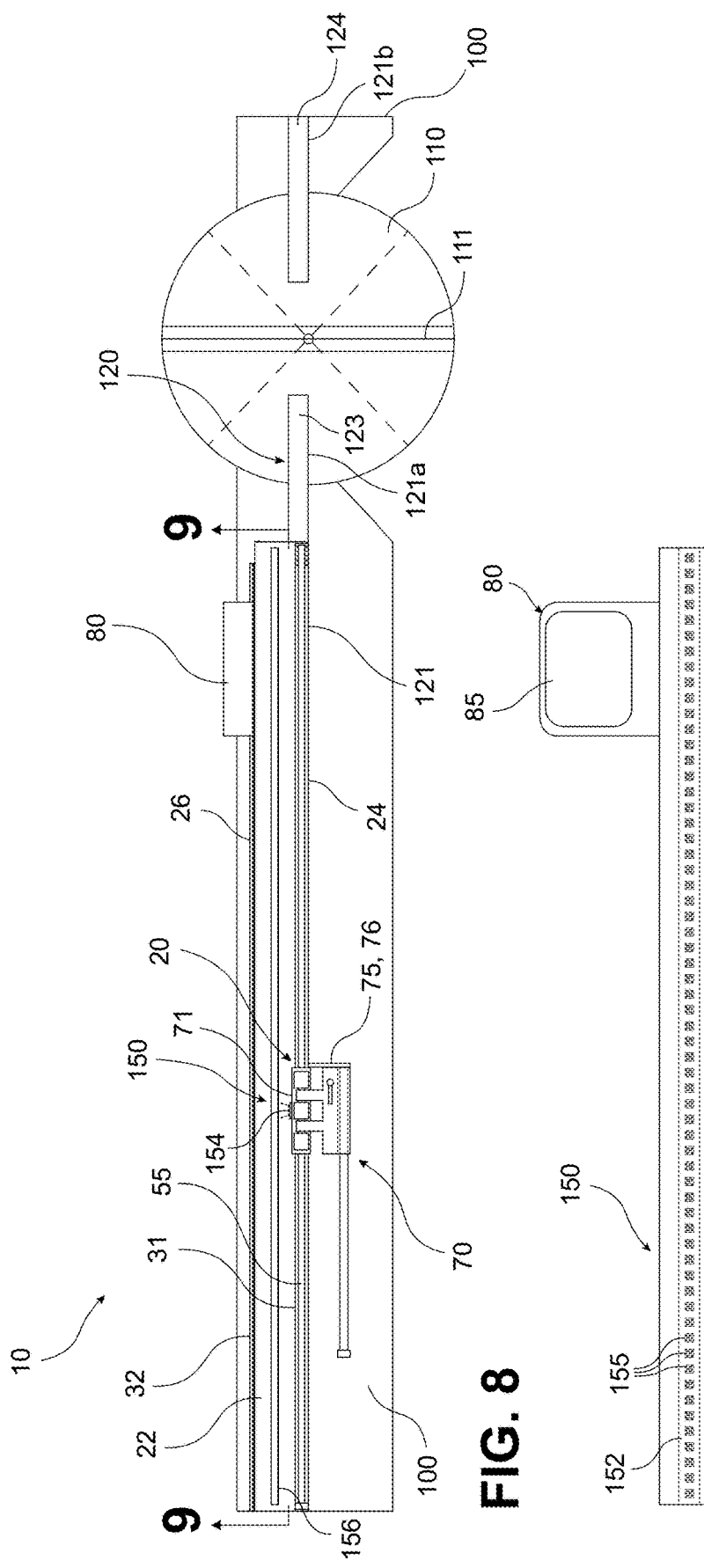

MITER FENCE POSITIONER

CROSS-REFERENCE TO RELATED APPLICATION

This patent application claims priority to U.S. Provisional Patent Application Ser. No. 62/945,307, filed on Dec. 9, 2020, the entire disclosure of which is hereby incorporated herein by reference.

FIELD OF THE INVENTION

The invention relates to an apparatus for positioning a stop block of a positioning mechanism for use with a miter saw assembly, and more specifically, to a position detection system for use with the positioning mechanism.

BACKGROUND OF THE INVENTION

A miter saw is generally used to make a cross-cut through a work piece at a desired cut angle and position. The miter saw may include an adjustable stop surface for accurately positioning the work piece relative to the cutting blade prior to the initiation of a cutting operation. Such stop surfaces may be manually adjusted to desired positions to establish a known distance between one end of the work piece and the cutting axis of the miter saw. The manual adjustment may include the manipulation of one or more structural elements to reposition and lock the stop surface to the desired position.

In an effort to improve the accuracy and adjustment time for such stop surfaces, it is desirable to replace the manually adjusted system with a motor-driven system capable of an automated repositioning process using a controller. For example, the motor-driven system may include a stop surface moveable in a longitudinal direction of the work piece along a rail or guide structure via the transformation of the rotary motion of the motor to the translational motion of the stop surface with respect to the longitudinal direction.

However, such motor-driven systems typically include a motor and controller assembly that requires the feedback generated by an encoder or similar control device to accurately and repeatedly position the stop surface relative to the cutting axis. The encoder may include a sensor assembly that monitors a rotor of the motor. For example, the rotor may include circumferentially spaced features that are detectable by the sensor assembly during rotation of the rotor in a manner wherein a degree of rotation of the rotor is able to be determined by determining how many times the spaced apart features pass by the sensor assembly. The corresponding controller accordingly utilizes the number of sensed passes of the rotor to determine the degree of rotation of the rotor. The detected degree of rotation of the rotor may in turn be converted to a linear distance traversed by a stop surface operatively coupled to the monitored rotor. The associated controller may therefore be responsible for initiating the rotation of the rotor via a suitable control signal before then determining the degree of rotation of the rotor via the feedback provided by the sensor assembly of the encoder.

The use of such an encoder greatly complicates the control scheme used to control the position of the stop surface, thereby adding unnecessary complexity and cost to the automated repositioning system.

Accordingly, it would be desirable to create an improved system for repositioning a stop surface of a miter saw assembly without requiring the use of an encoder or feedback producing device for communicating a condition of the motor to a controller associated therewith for determining an operational condition of the motor.

SUMMARY OF THE INVENTION

Compatible and attuned with the present invention, an improved positioning mechanism having a position detection system for use with a miter saw assembly is disclosed.

In one embodiment of the invention, a positioning mechanism for positioning a work piece relative to a cutting axis of a cutting tool is disclosed. The positioning mechanism includes a rotary motor having a selectively rotatable rotor, a stop mechanism having a stop surface configured to engage the work piece with the stop mechanism linearly translatable in a first direction, a motion conversion mechanism configured to transform rotary motion of the rotor to linear motion of the stop mechanism in the first direction, a controller configured to selectively rotate the rotor to cause linear translation of the stop mechanism in the first direction toward or away from the cutting axis, and a position detection system comprising a visual sensor coupled to the stop mechanism and a ruler strip. The ruler strip includes a plurality of spaced apart position indicators configured for detection by the visual sensor in order to determine a position of the stop mechanism relative to the first direction.

According to another embodiment of the present invention, a positioning mechanism for positioning a work piece relative to a cutting axis of a cutting tool is disclosed. The positioning mechanism comprises a stop mechanism having a stop surface configured to engage the work piece with the stop mechanism linearly translatable in a first direction towards or away from the cutting axis. The positioning mechanism further comprises a position detection system comprising a ruler strip and a visual sensor. The ruler strip extends longitudinally in the first direction and includes a plurality of position indicators provided thereon with the position indicators spaced apart from each other with respect to the first direction. The visual sensor is coupled to the stop mechanism and configured to move in unison therewith when the stop mechanism is linearly translated in the first direction. The visual sensor has a viewing axis directed towards the ruler strip with the visual sensor configured to selectively sense each of the position indicators when a corresponding one of the position indicators has a predefined relationship with respect to a viewing range of the visual sensor.

According to additional aspects of the present invention, each of the position indicators may communicate information regarding a position of the corresponding one of the position indicators with respect to the first direction. Each of the position indicators may be provided to include a visual pattern to differentiate each of the position indicators from one another. Each of the position indicators may be provided as a QArt code pattern. The position indicators may be equally spaced from each other with respect to the first direction. At least one of the position indicators may be disposed to correspond to a desired position of the stop mechanism when the visual sensor senses the at least one of the position indicators. The predefined relationship of the position indicator within the viewing range of the visual sensor may include the corresponding one of the position indicators being centered with respect to the viewing range of the visual sensor. The viewing axis of the visual sensor may be arranged perpendicular to the first direction. The ruler strip may be provided on a planar surface arranged parallel to the first direction. The ruler strip may be provided on a structure acting as a guide for positioning the work piece relative to the cutting axis of the cutting tool.

The positioning mechanism may further comprise a controller in signal communication with the visual sensor. The controller may be configured to analyze the corresponding one of the position indicators being instantaneously sensed to determine which among the plurality of the position indicators is being instantaneously sensed. The controller may be configured to correlate a determination of which of the plurality of the position indicators is instantaneously being sensed to a position of the stop mechanism with respect to the first direction. The positioning mechanism may further comprise a rotary motor in signal communication with the controller with the rotary motor having a selectively rotatable rotor and a motion conversion mechanism configured to transform rotary motion of the rotor to linear motion of the stop mechanism and the visual sensor with respect to the first direction. The rotor may be rotatable to a finite number of rotational positions with the rotational positions equally angularly spaced apart, wherein a selective rotating of the rotor by the controller includes pulsing the rotor to an adjacent rotational position of the finite number of rotational positions. The controller may be configured to repeatedly pulse the rotor in a first rotational direction starting from an initial rotational position of the rotor, wherein the repeated pulsing of the rotor in the first rotational direction may occur until one of the position indicators is sensed by the visual sensor. The controller may be configured to count and record the number of pulses necessary to pulse the rotor in the first rotational direction from the initial position thereof to a position of the rotor corresponding to the sensing of the one of the position indicators. The controller and the rotary motor may not be associated with an encoder for providing feedback regarding rotation of the rotor. The rotary motor may be a stepper motor and the motion conversion mechanism may be one of a conveyer system, a linear screw drive, or a roller assembly.

BRIEF DESCRIPTION OF THE DRAWINGS

The above, as well as other objects and advantages of the invention, will become readily apparent to those skilled in the art from reading the following detailed description of a preferred embodiment of the invention when considered in the light of the accompanying drawings:

FIG. 1 is a top plan view of a miter saw assembly having a positioning mechanism according to an embodiment of the present invention;

FIG. 2 is a cross-sectional elevational view of a positioning system of the miter saw assembly of FIG. 1 as taken through section lines 2-2 of FIG. 1;

FIG. 3 is a top plan view of the miter saw assembly of FIG. 1 immediately prior to a cutting operation through a work piece with a stop of the positioning system in a retracted position;

FIG. 4 is a top plan view of the miter saw assembly of FIG. 1 immediately prior to a cutting operation through a work piece with the stop of the positioning system in a partially extended position;

FIG. 8 is a top plan view of a positioning mechanism having a position detection system according to another embodiment of the present invention;

FIG. 9 is an elevational view of a ruler strip of the position detection system as taken from the perspective of lines 9-9 in FIG. 8;

DETAILED DESCRIPTION OF THE INVENTION

Figure 5:
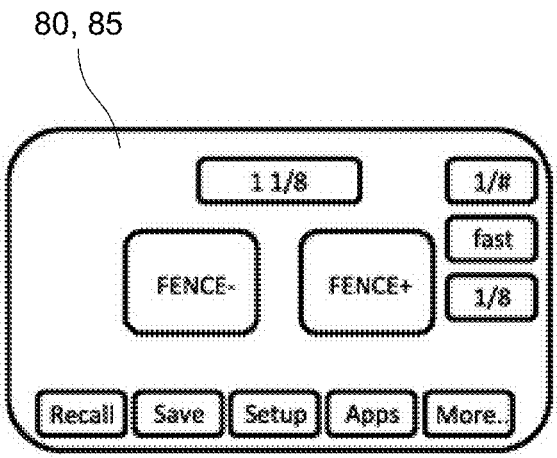
FIGS. 5-7 are examples of graphical representations generated by a controller of the miter saw assembly on a display screen thereof.

The following detailed description and appended drawings describe and illustrate various embodiments of the invention. The description and drawings serve to enable one skilled in the art to make and use the invention, and are not intended to limit the scope of the invention in any manner. In respect of the methods disclosed, the steps presented are exemplary in nature, and thus, the order of the steps is not necessary or critical.

FIG. 1 illustrates a miter saw assembly 10 having a positioning mechanism 20 according to an embodiment of the invention. The miter saw assembly 10 includes a fixed table 100, a rotary table 110, a fence 120, a cutting tool (not shown) such as a miter saw blade, and the positioning mechanism 20. Although the positioning mechanism 20 is described with reference to a miter saw assembly 10, it should be understood that the positioning mechanism 20 may be used in conjunction with any type of cutting or machining tool where a selective positioning of a work piece relative to a cutting axis of the cutting tool is desired without necessarily departing from the scope of the present invention.

The fixed table 100 supports the fence 120, the cutting tool, and the positioning mechanism 20. The fixed table 100 forms a horizontal and substantially planar surface for supporting a work piece, such as a board 99 to be sawed by the cutting tool (miter saw). The fixed table 100 may be coupled to or supported by a support frame (not shown) elevating the miter saw assembly 10 away from a ground surface. The fixed table 100 may alternatively be coupled to or supported by any suitable structure, as desired.

The rotary table 110 includes an upper surface arranged co-planar to an upper surface of the fixed table 100. The rotary table 110 is configured to rotate relative to the fixed table 100 wherein a rotational position of the rotary table 110 relative to the fixed table 100 determines a rotational position of a cutting axis 111 of the cutting tool relative to the longitudinal direction of the fence 120. The cutting axis 111 may for example represent an axis along which a saw blade performs a cut through the work piece when the corresponding blade is moved along the cutting axis 111. However, the cutting axis 111 may alternatively represent any axis through which any type of cutting tool may pass, as desired.

The cutting axis 111 may be adjusted to a plurality of different rotational positions for performing cuts through the work piece at a plurality of different angles relative to the longitudinal direction of the fence 120. The cutting axis 111 is shown in FIG. 1 as being arranged perpendicular to the longitudinal direction of the fence 120. Alternatively, FIG. 1 shows two dashed lines representing alternative positions of the cutting axis 111 following about a 45 degree rotation of the rotary table 110 relative to the fixed table 100 in each of a clockwise direction and a counter-clockwise direction. It is understood that any number of rotational positions of the rotary table 110 and hence the cutting axis 111 may be used without necessarily departing from the scope of the present invention.

The fence 120 includes a guide surface 121 for arranging the work piece relative to the cutting axis 111. In the provided example, the fence 120 includes a first segment 123 having a first guide surface 121a formed to a first side of the cutting axis 111 as well as a second segment 124 having a second guide surface 121b formed to an opposing second side of the cutting axis 111. The first guide surface 121a and the second guide surface 121b are arranged co-planar to each other and perpendicular to the upper surface of the fixed table 100. The guide surfaces 121a, 121b and the upper surface of the fixed table 100 accordingly form perpendicular arranged surfaces for establishing the position of two perpendicular arranged surfaces of the associated work piece when the work piece is pressed against the guide surface 121 and resting on the fixed table 100.

The positioning mechanism 20 includes a housing 22, a rotary motor 40, a conveyer assembly 50, and a stop mechanism 70. The positioning mechanism 20 is further controlled by a controller 80 in signal communication with the rotary motor 40.

The housing 22 may be formed as an extrusion having a substantially constant cross-section as the housing 22 extends longitudinally from end to end, thereby simplifying formation of the housing 22. In the provided embodiment, the housing 22 is formed from a main body having a substantially constant rectangular cross-sectional shape defining a longitudinally extending central opening 25 for receiving the rotary motor 40 and portions of the conveyer assembly 50. Although described as a single opening 25, it should be understood by one skilled in the art that the housing 22 may be formed to include any number of chambers or compartments for housing the components disclosed herein without necessarily departing from the scope of the present invention.

In some embodiments, the housing 22 may be disposed on an upper surface of the first segment 123 of the fence 120 and may include a front surface 24 that is either arranged co-planar with the guide surface 121 of the fence 120 or indented rearwardly therefrom such that the housing 22 does not undesirably interfere with the placement of the board 99 or another associated work piece relative to the fence 120. In other embodiments, the housing 22 may form a portion of the first segment 123 of the fence 120 with the front surface 24 of the housing 22 arranged co-planar with the remainder of the guide surface 121 of the fence 120 and the housing 22 supported directly on the fixed table 100, as desired.

A first rail structure 31 projects from an upper surface of the housing 22 adjacent the front surface 24 thereof while a second rail structure 32 projects from a rear surface 26 of the housing 22 formed opposite the front surface 24. In other embodiments, the second rail structure 32 may project from the upper surface of the housing 22, as desired. The first rail structure 31 and the second rail structure 32 may each include an opening (not shown) having a shape suitable for forming an interference fit with a portion of a sliding mechanism slidably disposed within the opening. For example, each of the rail structures 31, 32 may include an opening having a substantially T-shaped cross-section for receiving a substantially T-shaped structure extending from a corresponding sliding mechanism. Alternative structures for forming a mating and sliding connection may be utilized without departing from the scope of the present invention.

The conveyer assembly 50 includes a first pulley member 51, a second pulley member 52, and a belt 55. The first pulley member 51 is disposed adjacent a first end of the housing 22 opposite the cutting axis 111 and is operatively engaged to a rotor 41 of the rotary motor 40 such that rotation of the rotor 41 is directly transferred to the first pulley member 51. The second pulley member 52 is disposed adjacent an opposing second end of the housing 22 adjacent the cutting axis 111 and may be rotationally supported by an axel 56 or the like extending laterally from the housing 22. However, the position of the rotary motor 40 and the axel 56 may be reversed, as desired, without departing from the scope of the present invention.

The belt 55 may be formed into a loop tensioned between the first pulley member 51 and the second pulley member 52. The belt 55 may include a plurality of teeth or similar structures (not shown) extending from an inner surface thereof while each of the pulley members 51, 52 may include corresponding teeth or similar structures (not shown) projecting from the outer surfaces thereof for mating with the teeth or similar structures of the belt 55. Accordingly, the rotational motion of the rotary motor 40 may be transferred from the rotor 41 to the remainder of the conveyer assembly 50 via the engagement of the first pulley member 51 with the belt 55 and the engagement of the belt 55 with the second pulley member 52. It should further be understood by one skilled in the art that additional pulley members may be added for further re-routing or tensioning the belt 55 relative to the housing 22 without departing from the scope of the present invention, so long as at least a portion of the belt 55 extends in the longitudinal direction of the fence 120 for adjusting the position of the stop mechanism 70 in the manner described hereinafter.

The rotary motor 40 may be any type of motor that does not utilize an encoder, resolver, or other sensing device for determining and communicating a rotational position of the rotor 41 to the controller 80 following motion of the rotor 40, hence the rotary motor 40 operates as an open-loop controller for controlling the position of the stop mechanism 70. In other words, the controller 80 actively controls the rotational position of the rotor 41, and hence the translational position of the stop mechanism 70, without requiring the use of feedback data communicated back to the controller 80 regarding a detected degree of rotation of the rotor 41 when the rotary motor 40 is activated to be rotationally repositioned.

Such direct motor control in the absence of feedback may be accomplished using any type of motor having stepped rotational control, such as a traditional stepper motor wherein the rotor 41 interacts magnetically with a plurality of circumferentially spaced electromagnets surrounding the rotor 41. A full rotation of the rotor 41 is accomplished via a plurality of equal and incremental rotational movements of the rotor 41 between a defined number of equally spaced rotational positions. A portion of an outer circumferential surface of the rotor 41 may be first electromagnetically attracted to an electrically energized one of the circumferentially spaced electromagnets as determined by the controller 80 to establish an initial rotational position of the rotor 41. Each time the rotational position of the rotor 41 is to be changed, the controller 80 sends a signal indicating that one of the electromagnets disposed adjacent the energized one of the electromagnets is to be selectively energized following a de-energizing of the previously energized electromagnet. The rotor 41 in turn moves from one rotational position to the adjacent rotational position while passing through a defined angle of rotation. This process may be repeated to cause continued rotation of the rotor 41 in a given rotational direction or may be reversed to cause the rotor 41 to change rotational directions. As used hereinafter, the process of repositioning the rotor 41 between adjacent rotational positions is referred to as "pulsing" the rotary motor 40 due to the manner in which the traditional stepper motor utilizes a series of input pulses (typically square wave pulses) for controlling the rotational position of the rotor 41.

The stepper motor forming the rotary motor 40 may be configured to move through any suitable incremental angle of rotation when pulsed so long as an integer number of incremental rotational steps provides for one full rotation of the rotor 41. For example, the rotary motor 40 may be configured to include 100 incrementally stepped positions with each of the positions separated from an adjacent position by 3.6 degrees, 200 incrementally stepped positions separated by 1.8 degrees, 400 incrementally stepped positions separated by 0.9 degrees, and so on. However, the rotary motor 40 may be selected to include any desired number of suitable rotational positions without necessarily departing from the scope of the present invention. The degree of linear translation of the stop mechanism 70 in response to each incremental repositioning of the rotor 41 may be determined by selecting a ratio of the diameter of the rotor 41 to a diameter of the first pulley member 51, as desired. Furthermore, the mechanical coupling of the rotor 41 to the stop mechanism 70 may also include the use of intermediary components such as additional pulleys, gears, or the like for transferring the motion of the rotor 41 to that of the stop mechanism 70. Hence, the ratio of the rotational motion of the rotor 41 to the translational motion of the slider mechanism 70 may further be related to the presence and structure of any such intervening components. One skilled in the art should understand that any combination of kinematic relationships may be present between the rotor 41 and the stop mechanism 70 so long as the relationship present between the degree of rotation of the rotor 41 and the corresponding translation of the stop mechanism 70 is known by the controller 80. As such, the controller 80 can correctly determine the position of the stop mechanism 70 based on knowledge of the number and the rotational direction of each of the rotational pulses of the rotary motor 40.

The stop mechanism 70 includes a slider 71, a hinge assembly 72, at least one rotatable arm 73, a shaft guide 74, and a stop 75. The slider 71 slidably engages the first rail structure 31 and includes corresponding structure (not shown) for forming an interference fit within the opening formed by the first rail structure 31. For example, the slider 71 may include a substantially T-shaped projection (not shown) depending from an underside of the slider 71 and disposed within the T-shaped opening of the first rail structure 31. However, any suitable mating structure for forming the sliding connection between the slider 71 and the first rail structure 31 may be utilized without departing from the scope of the present invention. The slider 71 is rigidly coupled to an upper portion of the belt 55 extending over the first rail structure 31 in a manner wherein translation of the upper portion of the belt 55 in the longitudinal direction of the fence 120 causes a sliding of the slider 71 within the first rail structure 31. However, in some embodiments the belt 55 may be disposed entirely within the opening 25 and the portion of the housing 22 defining the first rail structure 31 may include a longitudinally extending slot or opening (not shown) through which structure connecting the belt 55 and the slider 71 may be disposed, as desired. In any event, the slider 71 is directly or indirectly mechanically coupled to the belt 55 in a manner wherein translational motion of the belt 55 is transferred to the slider 71.

The slider 71 may be rigidly coupled to opposing ends of a strip of material forming the belt 55 to allow for easy installation of the belt 55 over the opposing pulley members 51, 52 before the coupling of the slider 71 thereto. The slider 71 accordingly forms a portion of the belt 55 that is restricted to move linearly within the first rail structure 31 in a direction parallel to the longitudinal direction of the fence 120 and the longitudinal direction of the housing 22.

The shaft guide 74 is disposed at an end of the at least one rotatable arm 73. The stop 75 includes a stop surface 76 disposed at an end of a shaft 66 slidably received within the shaft guide 74. The stop 75 is configured to slide relative to the shaft guide 74 to selectively adjust a position of the stop 75 relative to the slider 71 with respect to the longitudinal direction of the fence 120. A locking device 79 may be used to affix an axial position of the shaft 66 within the shaft guide 74. The locking device 79 may be configured wherein the shaft 66 may only be affixed to the shaft guide 74 at predetermined positions to maintain a known distance between the stop surface 76 and the slider 71. For example, the shaft guide 74 and the shaft 66 may include spaced apart openings that can be aligned with each other in order to receive a locking device such as a pin or the like. The different positions may be spaced at equal intervals corresponding to common distances utilized during use of the miter saw assembly 10, such as increments equaling an inch or common fractions of an inch, as desired. However, one skilled in the art will appreciate that alternative locking devices and spacing intervals may be utilized without departing from the scope of the present invention.

As shown by comparison between FIGS. 3 and 4, the stop 75 may be moved in the longitudinal direction of the fence 120 towards the cutting axis 111 via the sliding of the shaft 66 within the shaft guide 74 in order to perform cuts at desired locations relative to the work piece (board) 99. Such sliding of the shaft 66 may occur in circumstances wherein a particularly small distance is required between the end of the work piece engaging the stop 75 and the cutting axis 111. The sliding stop 75 is accordingly adjustable to positions beyond the engagement between the slider 71 and the first rail structure 31 for arranging the end of the work piece more closely to the cutting axis 111, such as is illustrated in FIG. 4.

The hinge assembly 72 includes a first set of knuckles 77 secured to the slider 71 and a second set of knuckles 78 secured to the at least one rotatable arm 73. A hinge pin 82 extends through openings formed in the knuckles 77, 78 to hingedly couple the at least one rotatable arm 73 to the slider 71. The hinge assembly 72 may include a locking device (not shown) for affixing a position of the stop 75 in one of a stopping position wherein the stop surface 76 is adjacent the fixed table 100 and the guide surface 121 for engaging the work piece and a retracted position wherein the stop surface 76 is rotated away from the fixed table 100 and the work piece via rotation of the rotatable arm 73 such that the stop surface 76 does not interfere with or contact the work piece. The at least one rotatable arm 73 is shown as a single arm pivotally coupled to the slider 71 in FIG. 1, but the at least one rotatable arm 73 may alternatively be presented as a compound element having one or more additional joints for further collapsing the stop mechanism 70 when moved to the retracted position. The stop mechanism 70 may also include alternative structure for selectively retracting the stop 75, such as a rail structure or the like for sliding the stop 75 vertically away from the fixed table 100, as desired.

The controller 80 is prominently displayed to an operator of the miter saw assembly 10. Specifically, the controller 80 may include cooperating structure configured to engage the second rail structure 32 of the housing 22 to allow the controller 80 to be repositioned relative to the longitudinal direction of the housing 22 for ease of access during use of the miter saw assembly 10. A locking mechanism (not shown) may be used to removably affix a position of the controller 80 relative to the longitudinal direction of the housing 22, as desired. In other embodiments, the controller 80 may be permanently affixed in position relative to the housing 22 while prominently displayed to the operator, as desired.

The controller 80 includes the necessary structure for sending and receiving control signals, performing logical operations regarding the control signals, and displaying information to the operator of the miter saw assembly 10. The controller 80 accordingly includes a suitable memory, processor, and any associated instruction sets for carrying out the tasks assigned to the controller 80 as described herein. The controller 80 is in signal communication with a motor controller (not shown) of the rotary motor 40, and the controller 80 and the rotary motor 40 may each be in electrical communication with a common power source (not shown), as desired.

Referring to FIG. 5, an exemplary touchscreen display 85 of the controller 80 is disclosed. The display 85 is provided to display information regarding the condition of the miter saw assembly 10 as well as to provide a user interface for operating those aspects of the miter saw assembly 10 in signal communication with the controller 80, such as for controlling the position of the stop mechanism 70 with respect to the longitudinal direction of the fence 120. The display 85 may be directly integrated as a component of the controller 80 or the display 85 may be in signal communication with the controller 80, as desired, so long as the display 85 is able to communicate with the controller 80 in a manner wherein the information displayed by the display 85 corresponds to the information accessible to the controller 80, such as properly and concurrently correlating information relating to the position of the stop mechanism 70 to each of the controller 80 and the display 85.

The display 85 may include a position readout that illustrates the current position of the slider 71 (and hence the stop 75) in terms of a numeric distance value relative to a zero/home position corresponding to a numeric distance value of zero. The corresponding units of distance may be displayed in one or more of English units, Metric units, and fractions thereof. For example, the display 85 shows a current position of "1⅛" in a top central portion of the display 85 indicative of the stop mechanism 70 being displaced 1⅛ inch from the previously established zero/home position for the stop mechanism 70. The display 85 further illustrates a "fence–" key and a "fence+" key, wherein the "fence–" key is used to pulse and reposition the slider mechanism 70 one incremental position to the left (negative direction with respect to the displayed numeric value) and the "fence+" key is used to pulse and reposition the slider mechanism 70 one incremental position to the right (positive direction with respect to the displayed numeric value). Either key may be held to cause the rotary motor 40 to be pulsed periodically to cause repeated incremental movement of the slider mechanism 70 in the selected direction of translation. The controller 80 is configured to constantly update the illustrated numeric position data shown on the display 85 in accordance with the number of pulses of the rotor 41 in either rotational direction as counted by the controller 80.

The display 85 also illustrates keys for adjusting the distance the slider mechanism 70 moves in response to each press of one of the "fence–" key or the "fence+" key, such as the illustrated distance of ⅛ inch. The available increments of distance may be selected to be multiples of the distance the slider mechanism 70 travels in the longitudinal direction of the fence 120 when the rotary motor 40 repositions the rotor 41 thereof one incremental rotational position. For example, if the rotary motor 40 is incremented such that the smallest possible rotation of the rotor 41 when stepped to the next position corresponds to 1/32 of an inch, then the available increments may be multiples of 1/32, such as 1/16, ⅛, ¼, ½, etc. The display 85 further indicates a speed setting, wherein the speed setting may be used to determine how quickly the rotor 41 is pulsed between adjacent incremental positions.

Figure 6:
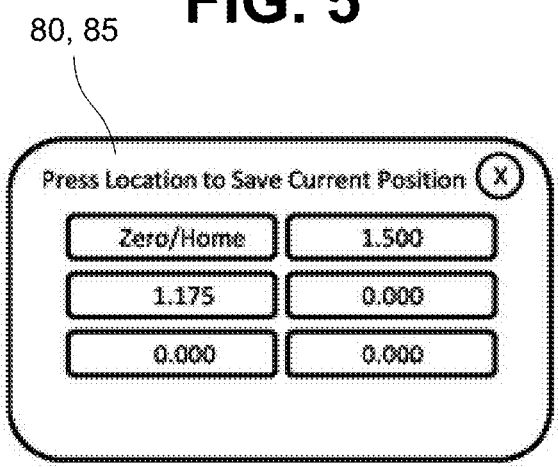

Referring to FIG. 6, the memory of the controller 80 includes functionality for saving current positions and recalling previously stored positions. Exemplary positions may include 'zero/home' and various other positions that may be user-set memory positions. The controller 80 may also allow for direct entry of positional information, as desired.

Figure 7:
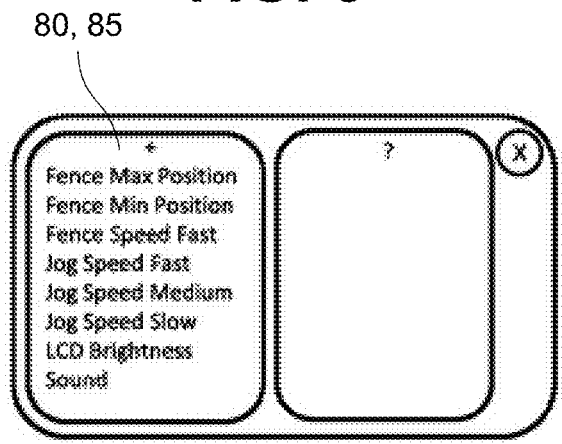

Referring to FIG. 7, the display 85 of the controller 80 may include a screen for setup and the selection of various operational settings. The system setup screen allows the user to adjust system parameters and preferences. Exemplary parameters are shown in the left-hand side of the screen. The right-hand side of the screen may be reserved for editing the selected parameter. Once a parameter is selected, a graphical image may visually display the depicted item. The controller 80 may further include a USB port or like port for downloading and uploading data to the controller 80, as desired.

The controller 80 is configured to selectively rotate the rotor 41 of the rotary motor 40 to in turn translate the belt 55 and hence the slider 71 relative to the fence 120. The controller 80 may be a conventional Programmable Logic Controller (PLC) known to those skilled in the art. The PLC may receive outputs from the display 85 and may in turn send control signals to the rotary motor 40, which in turn adjusts the rotational position of the rotor 41 thereof. The controller 80 may include a Dynamic Link Library (DLL) that stores stop positions and cutter configurations in memory for later use. Stop positions may be set by the user or set automatically when a certain cutter configuration is used. The system may further include a touch-off plate known to those skilled in the art for zeroing the device between stop position adjustments.

In use, an operator of the miter saw assembly 10 sets a rotational position of the cutting axis 111 as is desired for the given application of the cutting tool. The operator then determines a desired position for the work piece 99 relative to the cutting axis 111 for performing the desired cutting operation. The operator then controls a position of the slider 71 relative to the longitudinal direction of the housing 22 through use of the touch screen display 85 of the controller 80. The motion of the slider 71 also sets a position of the stop surface 76 of the stop mechanism 70. As explained herein, the operator may choose to jog the slider 71 to a specified position by interacting with the touch screen display 85 (such as pressing and holding indicia indicating a specific direction of travel) or the controller 80 may be preprogrammed to move the slider 71 to a specific position based on a selection of the operator from a preprogrammed list accessible via the display 85. Movement of the slider 71 in a first translational direction includes a rotation of the rotor 41 in a first rotational direction while translation of the slider 71 in an opposing second translational direction includes a rotation of the rotor 41 in a second opposing rotational direction. The rotation of the rotor 41 causes the rotation of the first pulley member 51, which in turn causes a portion of the belt 55 coupled to the slider 70 to translate in a longitudinal direction of the housing 22. The controller 80 controls the rotation of the rotor 41 without requiring the feedback from an encoder (or the like) associated with the rotary motor 40 and the controller 80 due to the manner in which the controller 80 actively pulses the rotor 41 to new rotational positions without monitoring the rotation of the rotor 41. Instead, the controller 80 is aware of the position of the rotor 41 and/or the slider 71 by referencing information stored to the controller 80 regarding at least one previous condition of the rotor 41 and/or slider 71 and a history of each pulsed movement that has taken place since the reference condition of the rotor 41 and/or slider 71.

The operator may also set a position of the stop surface 76 relative to the slider 71 by sliding the shaft 66 to a desired position relative to the shaft guide 74 such that a known relationship (distance) exists between a position of the stop surface 76 and a position of the slider 71 as set by the controller 80. The stop surface 76 may be secured by adjusting the locking device 79 when the shaft 66 is slid to the desired position. Once the position of the stop surface 76 is established, the operator may then place the work piece 99 in abutting contact with the stop surface 76 and one or more of the front surface of the housing 22 and the fence 120. The work piece 99 is then positioned for a desired cutting operation to take place through use of the corresponding cutting tool.

The disclosed positioning mechanism 20 provides numerous advantages over the positioning systems of the prior art. The use of the stepper motor having pulsed and incremental control allows for precise and repeatable positioning of the stop mechanism 70 relative to the associated cutting axis 111. The incremental control is also achieved without the use of an encoder, resolver, or similar sensing device for providing feedback, thereby resulting in reduced cost and complexity in manufacturing the positioning mechanism 20. The stop mechanism 70 includes a stop surface 76 that is beneficially translatable relative to the remainder of the stop mechanism 70 for performing cuts adjacent an end of an associated work piece. The stop mechanism 70 is also adjustable between a retracted position and a stop position to allow for the selective use of the stop mechanism 70 depending on the given application.

Although the positioning mechanism 20 has been shown and described with regards to a conveyer assembly as the corresponding motion conversion mechanism, it should be appreciated by one skilled in the art that any variety of additional motion conversion mechanisms configured to convert the rotary motion of the rotor 41 to the linear motion of the stop mechanism 70 may be utilized without necessarily departing from the scope of the present invention. For example, the conveyer assembly may be replaced with a linear screw drive system (not shown) wherein a screw driven by the rotary motor 40 causes the linear translation of a guided nut formed by the stop mechanism 70. Alternatively, the stop mechanism 70 may include the rotary motor 40 coupled thereto for rotating wheels or rollers (not shown) rotatably coupled to the stop mechanism 70 relative to a guide surface extending in the direction of travel of the stop mechanism 70. In either circumstance, the associated system includes a known conversion of the rotary motion of the associated rotor into the linear motion of the associated stop mechanism 70 such that the controller 80 may suitably determine the numerical position of the stop mechanism 70 relative to a selected zero/home reference position. Furthermore, although not shown or described herein, it should also be apparent to one skilled in the art that additional rotary motion mechanisms may be disposed between the associated rotor and the associated stop mechanism for further controlling the conversion of the rotary power to the linear motion, such as a suitable gear box, pulley system, or the like, without altering the manner of operation of the miter saw assembly 10.

With reference to FIGS. 8 and 9, the positioning mechanism 20 may be further configured to include a position detection system 150. The position detection system 150 is configured to detect an instantaneous position of the stop mechanism 70 with respect to the longitudinal direction of the fence 120 and to communicate the detected position of the stop mechanism 70 to the controller 80 of the positioning mechanism 20. The use of the position detection system 150 allows for the controller 80 to account for the actual position of the stop mechanism 70 when the controller 80 pulses the stop mechanism 70 to a newly selected position, and especially a new position that is preprogrammed into the memory of the controller 80.

The detected position of the stop mechanism 70 may in turn be converted to a known distance present between the stop surface 76 of the stop mechanism 70 and the cutting axis 111 of the miter saw assembly 10 with respect to the longitudinal dimension of the fence 120. This distance is related to a distance present between the position of the cut performed through the work piece 99 along the cutting axis 111 and the position of the end of the work piece 99 contacting the stop surface 76 of the stop mechanism 70. This distance may be calculated by the controller 80 as a result of the controller 80 having knowledge of any spatial relationships associated with the miter saw assembly 10 that are necessary for calculating the distances between the relevant components of the miter saw assembly 10 based on the instantaneous condition of the miter saw assembly 10. For example, the detection of the instantaneous position of the stop mechanism 70 may include determining the position of a specific landmark of the stop mechanism 70 that is spaced from the stop surface 76 with respect to the longitudinal direction of the fence 120, hence this spacing distance must be accounted for when attempting to correlate the position of the landmark relative to the stop surface 76, or any other desired feature of the stop mechanism 70. Such relationships may be preprogrammed into the controller 80 so that any data provided to the operator of the miter saw assembly 10 by the controller 80 is directly applicable to the task at hand and not in need of further calculation or calibration by the operator.

The position detection system 150 generally includes a ruler strip 152 (FIG. 9) and a visual sensor 154. The ruler strip 152 is formed by a planar and longitudinally extending surface having a plurality of longitudinally spaced apart position indicators 155 presented thereon. The position indicators 155 may be printed on the ruler strip 152 or may be independently provided and subsequently adhered to or otherwise coupled to the ruler strip 152. The ruler strip 152 may be presented as an adhesive backed strip or the like adhered to a support surface 156 of the position detection system 150. In the embodiment shown in FIG. 8, the support surface 156 is arranged perpendicular to the upper surface of the fixed table 100 and extends longitudinally in parallel to the guide surface 121 of the fence 120 at a position adjacent the conveyer belt 55, and hence the path of the stop mechanism 70. Specifically, the support surface 156 may be formed by a face of a wall or similar structure facing towards the stop mechanism 70. In other embodiments, the ruler strip 152 may be formed by the inclusion of the position indicators 155 directly on the support surface 156 in the absence of any type of tape or other secondary material coupled to the support surface 156. The ruler strip 152 may be oriented such that an axis passing through a center of each of the position indicators 155 is arranged parallel to an axis representative of the direction of travel of the stop mechanism 70 along the longitudinal direction of the fence 120.

The position indicators 155 may be equally spaced from each other with respect to the longitudinal direction of the fence 120 or may be disposed at specific positions on the ruler strip 152 that signify positions of specific interest to the operator. The positions of specific interest may include the end positions of the ruler strip 152 or those positions on the ruler strip 152 corresponding to common positions for the stop mechanism 70 to be repositioned, such as one or more cutting positions repeatedly used by the operator of the miter saw assembly 10 for performing specific repeated tasks. The position indicators 155 may be presented as any types of markings, images, icons, patterns, or the like for visual detection by the visual sensor 154.

According to one preferred embodiment of the invention, each of the plurality of the position indicators 155 includes a unique appearance that may be easily recognized by the controller 80 when detected by the visual sensor 154. Each of the position indicators 155 may include an appearance suitable for encoding information therein that can be extracted via analysis using the controller 80. For example, each of the position indicators 155 may be a unique QArt® code pattern or a traditional bar code pattern having a configuration known by and/or able to be recognized by the controller 80. The controller 80 may be preprogrammed to recognize certain code patterns (such as a fixed library of the QArt code patterns or bar code patterns known to be representative of the position indicators 155 expected to be detected) or may be configured to analyze the specific configuration of the instantaneously detected one of the position indicators 155 to extract any information encoded therein. However, the position indicators 155 may be presented as any combination of varied visual cues, including any combination of lines, shapes, letters, numbers, or other markings, as desired, so long as the controller 80 is able to detect the presence of one of the position indicators 155 within a viewing range of the visual sensor 154 and to differentiate the different position indicators 155 from each other in order to determine an instantaneous position of the visual sensor 154 relative to the ruler strip 152. As used hereinafter, the position indicators 155 having a specific configuration for recognition by the controller 80 following detection by the visual sensor 154 may be referred to as being coded position indicators 155.

The visual sensor 154 is coupled to the slider 71 of the stop mechanism 70 in a manner wherein the visual sensor 154 moves in unison with the slider 71 when the slider 71 is repositioned with respect to the longitudinal direction of the fence 120. The visual sensor 154 is also in signal communication with the controller 80 to communicate any data sensed by the visual sensor 154 thereto. The visual sensor 154 may refer to any type of camera or other visual sensing means capable of acquiring visual information regarding the ruler strip 152 and the position indicators 155 disposed thereon. The visual sensor 154 may be configured to periodically take images of the ruler strip 152 during operation of the position detection system 150. Each of these images, or rather the data representative of the contents of each of the images, is in turn communicated to the controller 80. The controller 80 is preprogrammed to analyze and interpret the data associated with each of the images to determine if a triggering event has occurred, such as the instantaneous sensing of one of the position indicators 155 as described hereinafter.

The visual sensor 154 is also oriented such that a viewing axis of the visual sensor 154 is directed towards the ruler strip 152 for being able to detect the position indicators 155 disposed thereon. As used herein, the viewing axis of the visual sensor 154 refers to an axis extending from the visual sensor 154 to the instantaneous portion of the ruler strip 152 being sensed (seen) by the visual sensor 154. The orientation of the viewing axis determines a perspective of each image taken by the visual sensor 154. In the instant example, the viewing axis is arranged perpendicular to the longitudinal direction of the fence 120, parallel to the support surface of the fixed table 100, and at an elevation relative to the fixed table 100 such that the viewing axis passes through each of the position indicators 155 presented on the ruler strip 152.

A viewing range of the visual sensor 154 refers to all visual information that can instantaneously be sensed by the visual sensor 154 and thereby represented in the contents of a corresponding image instantaneously taken by the visual sensor 154. The viewing range of the visual sensor 154 may be 2-dimensional projection of the light sensed by the visual sensor 154, such as a rectangular grid of the light sensed by the visual sensor 154 with the grid having a known resolution of pixels along each of two perpendicular axes. The viewing axis of the visual sensor 154 may accordingly point towards a center of the corresponding viewing range and therefore may be representative of a center of any images acquired by the visual sensor 154. The viewing range of the visual sensor 154 may be selected so that only one of the position indicators 155 is entirely present within the viewing range at any given time to ensure that the controller 80 properly analyzes and interprets the data associated with each of the images taken by the visual sensor 154. The viewing range may be based on the distance present between the visual sensor 154 and the ruler strip 152 with respect to the viewing axis and the lens angle of the visual sensor 154, among other factors.

The described orientation of the viewing axis relative to the ruler strip 152 is present regardless of the position of the slider 71 relative to the longitudinal direction of the fence 120. A sliding of the slider 71 results in a corresponding sliding of the visual sensor 154 with the visual axis thereof directed to pass along and through each of the successive position indicators 155 provided on the ruler strip 152. As the slider 71 passes by the spaced apart position indicators 155 provided on the ruler strip 152, the visual sensor 154 is able to sense the presence of each of the intervening position indicators 155 by the continuous visual monitoring of the ruler strip 152 within the viewing range of the visual sensor 154.

As used herein, the visual sensor 154 is said to sense a corresponding one of the position indicators 155 when the corresponding one of the position indicators 155 has a predefined relationship with respect to the viewing range of the visual sensor 154. The predefined relationship may include the corresponding one of the position indicators 155 being located within the viewing range of the visual sensor 154 or the corresponding one of the position indicators 155 being located at a specific position within the viewing range of the visual sensor 154. The corresponding one of the position indicators 155 having a specific position within the viewing range may refer to the visual representation of the corresponding one of the position indicators 155 being within the viewing range of the visual sensor 154 while also substantially overlapping or otherwise being aligned with specific pixels of the grid of pixels representative of the viewing range. Such a specific position may refer to the corresponding one of the position indicators 155 being centered within the viewing range such that the corresponding viewing axis of the visual sensor 154 is directed towards the center of the corresponding one of the position indicators 155, as one non-limiting example. In the case of a square or rectangular shape of each of the position indicators 155, such as the exemplary QArt code patterns or bar code patterns, the sensing of one of the position indicators 155 may occur only when the square or rectangular perimeter shape of the corresponding one of the position indicators 155 overlaps a corresponding square or rectangular portion of the viewing range and/or image derived from the viewing range.

As explained above, the rotary motor 40 is configured to pulse the rotor 41 by fixed rotational movements, wherein each of the rotational pulses of the rotor 41 corresponds to a distance of linear movement of the stop mechanism 70 with respect to the longitudinal direction of the fence 120. As such, the position indicators 155 may be provided on the ruler strip 152 such that only one of the possible linear positions of the stop mechanism 70 as determined by the pulsing of the rotor 41 corresponds to the sensing of the corresponding one of the position indicators 155. This allows for each of the sensing events to correspond to only one specific position of the stop mechanism 70 as determined by the pulsing of the rotary motor 40 among a plurality of finite possible positions of the stop mechanism 70 with respect to the longitudinal direction of the fence 120.

The one of the position indicators 155 being sensed by the visual sensor 154 may further include information encoded therein as is the case with the previously mentioned QArt code patterns or bar code patterns. The sensing of the one of the position indicators 155 may further include the controller 80 analyzing the data associated with the image taken of the one of the position indicators 155 in order to determine the contents of the encoded information. In the present example, each of the position indicators 155 may be coded to include information corresponding to a position of the instantaneously sensed one of the position indicators 155, such as a distance the instantaneously sensed one of the position indicators 155 is spaced apart from another landmark of the miter saw assembly 10 such as the cutting axis 111 thereof.

As the stop mechanism 70 is translated in the longitudinal direction of the fence 120, the visual sensor 154 is configured to visually sense (see) different portions of the ruler strip 152 passing relative to the visual range thereof as defined by the orientation of the viewing axis of the visual sensor 154. The visual sensor 154 takes images of the ruler strip 152 at desired intervals during the monitoring of the rule strip 152 and sends the data associated with each of the images to the controller 80 for further analysis. The controller 80 is configured to recognize when the visual sensor 154 has taken an image indicative of one of the position indicators 155 having the predetermined relationship with respect to the viewing range of visual sensor 154, such as the visual sensor 154 being visually aligned with one of the position indicators 155 with respect to the viewing axis of the visual sensor 154. For example, as mentioned above, the alignment may correspond to the one of the position indicators 155 that is instantaneously being sensed by the visual sensor 154 being centered on the image taken by the visual sensor 154.

The controller 80 is configured to analyze the data associated with the image including one of the position indicators 155 in order to determine which of the plurality of the position indicators 155 is instantaneously being sensed by the visual sensor 154. For example, each of the different position indicators 155 may include data corresponding to a distance of the instantaneously sensed position indicator 155 from the cutting axis 111 of the miter saw assembly 10, among other possible data that may be encoded into each of the position indicators 155. Once the controller 80 determines which of the position indicators 155 is instantaneously being sensed by the visual sensor 154, the controller 80 can determine the position of the stop surface 76 relative to the cutting axis 111 by referencing the known position of the instantaneously sensed position indicator 155 (such as one of the QArt code patterns) relative to the remaining components of the miter saw assembly 10 such as the visual sensor 154 and the remainder of the stop mechanism 70 coupled thereto. The controller 80 may accordingly be said to determine a position of the stop mechanism 70 when the controller 80 determines that the visual sensor 154 is sensing one of the position indicators 155 and when the controller 80 determines which of the position indicators 155 is being sensed by analysis of the image of the instantaneously sensed one of the position indicators 155.

The position detection system 150 operates generally as follows. During use of the positioning system 20, it may be desirable to know the instantaneous position of the slider 71 (stop mechanism 70) relative to the longitudinal direction of the fence 120 in order to move the stop surface 76 to a desired position for performing a cut on a work piece. Knowledge of the instantaneous position of the slider 71 may be desired when a session of use of the miter saw assembly 10 and the positioning mechanism 20 is first initiated, for example. The knowledge of the instantaneous position of the slider 71 may also be necessary when attempting to recalibrate or otherwise normalize a condition of the miter saw assembly 10, as desired.

The position detection system 150 causes the visual sensor 154 to begin monitoring the ruler strip 152 via visual inspection thereof. As mentioned above, the viewing range of the visual sensor 154 is generally limited to only a portion of the ruler strip 152 in substantial alignment with the visual sensor 154 with respect to the viewing axis arranged perpendicular to the longitudinal direction of the fence 120. If the visual sensor 154 and the controller 80 do not determine that one of the coded position indicators 155 is in alignment with the visual sensor 154 when the process is first initiated, the controller 80 causes the rotary motor 40 to be pulsed one position in a specified rotational direction for causing motion of the slider 71 in a specified linear direction along the belt 55, such as always moving the slider 71 in a linear direction towards the cutting axis 111 or away from the cutting axis 111. The slider 71 is repeatedly pulsed one additional position via the pulsing of the rotary motor 40 while the visual sensor 154 continues to monitor the ruler strip 152 with respect to each newly pulsed position of the slider 71. In this way, the controller 80 can repeatedly pulse the slider 71 to new positions until the visual sensor 154 eventually senses one of the coded position indicators 155 as described hereinabove. The knowledge by the controller 80 of the position of each of the unique coded position indicators 155 relative to the longitudinal direction of the fence 120 allows the controller 80 to accurately determine the instantaneous position of the slider 71 by reference to the known position of whichever of the coded position indicators 155 is being instantaneously sensed by the visual sensor 154. The controller 80 is also able to determine the instantaneous position of the remaining features of the stop mechanism 70, such as the corresponding stop surface 76, by referencing any known spatial relationships present between the different features of the stop mechanism 70.

The controller 80 may also be configured to count the total number of pulses required for moving the slider 71 from its initial position to the position wherein the position indicators 155 is first recognized by the visual sensor 154. As such, the controller 80 is able to pulse the rotary motor 40 an equal number of pulses in the opposite rotational direction for moving the slider 71 back to the initial position of the slider 71 occupied by the slider 71 when the position detecting process was first initiated. The position detection process may accordingly include a relatively small movement of the slider 71 in one direction for discovering one of the coded position indicators 155 and a subsequent and equally small movement of the slider in an opposing direction for returning the slider 71 to the initial position thereof. In this way, the operator can quickly and easily determine information regarding the positioning of the stop mechanism 70 while still being able to return the stop mechanism 70 to the most recently used position thereof.

Once the position of the slider 71 is known, the controller 80 may cause the slider 71 to be repositioned to any desired position relative to the longitudinal direction of the fence 120 by referencing the detected position and applying the known number of pulses required to reposition the slider 71 to the newly desired position. For example, the controller 80 may include data regarding various pre-saved positions of the slider 71 to which the slider 71 may be positioned once the position thereof is known. Such a process may include the operator selecting a pre-set position setting via the display 85, the slider 71 being moved in a preselected direction via a number of pulses until one of the coded position indicators 155 is detected and recognized, and then moving the slider 71 a desired and known number of pulses from the detected position to the pre-set and selected position. Depending on the programming of the controller 80 and the instantaneous position of the slider 71 when the process is initiated, the slider 71 may change directions between the steps of detecting the position of the slider 71 and then moving the slider 71 to the operator selected pre-set position.

The controller 80 may be further configured to operate the position detection system 150 in a position monitoring mode wherein the visual sensor 154 is continuously moved relative to the ruler strip 152 in a given direction until a desired one of the coded position indicators 155 is first detected by the visual sensor 154, thereby indicating that the slider 71 is to stop via a discontinuation of the pulsing of the rotor 41. For example, the visual sensor 154 may be configured to continually monitor for the presence of one of the coded position indicators 155 indicative of an end position on the ruler strip 152 for placing the slider 71 at an end position thereof, wherein the slider 71 is continuously pulsed towards the corresponding end position until it is reached.

Figure 10:
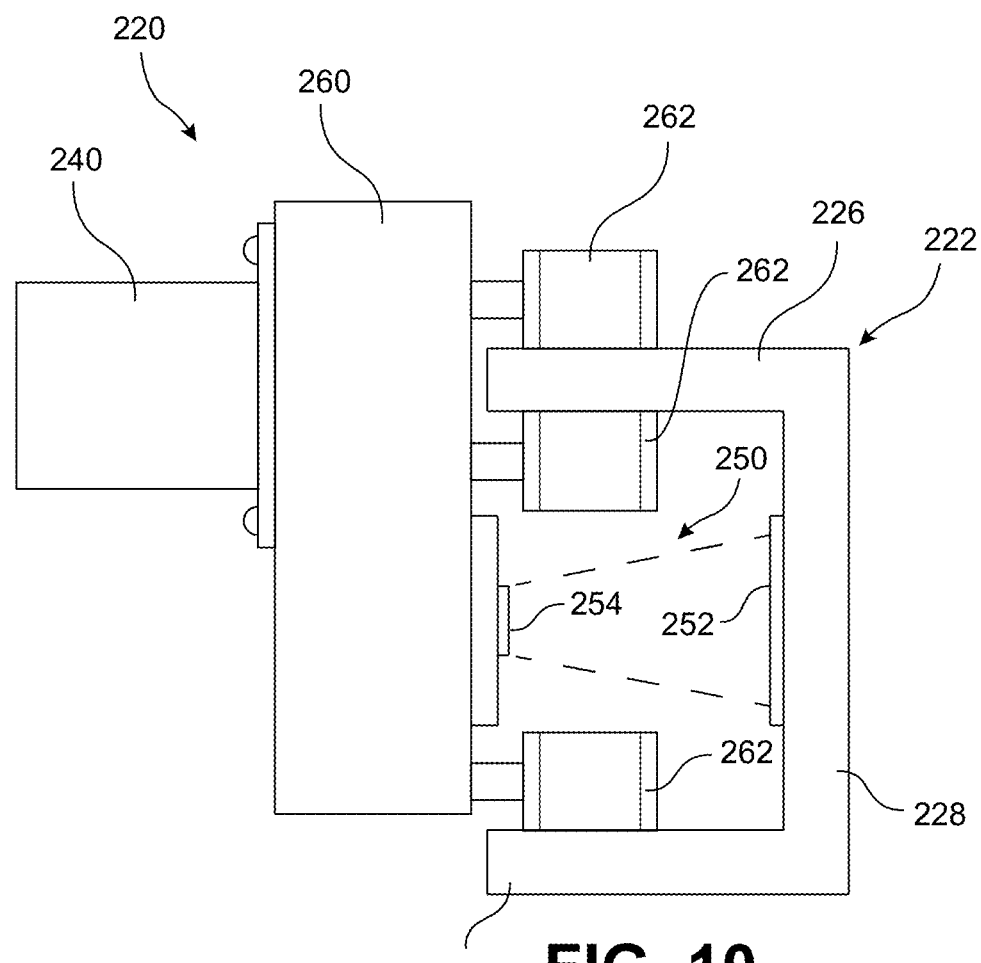
FIG. 10 is a side elevational view of a positioning mechanism having a position detection system according to another embodiment of the invention.
Figure 11:
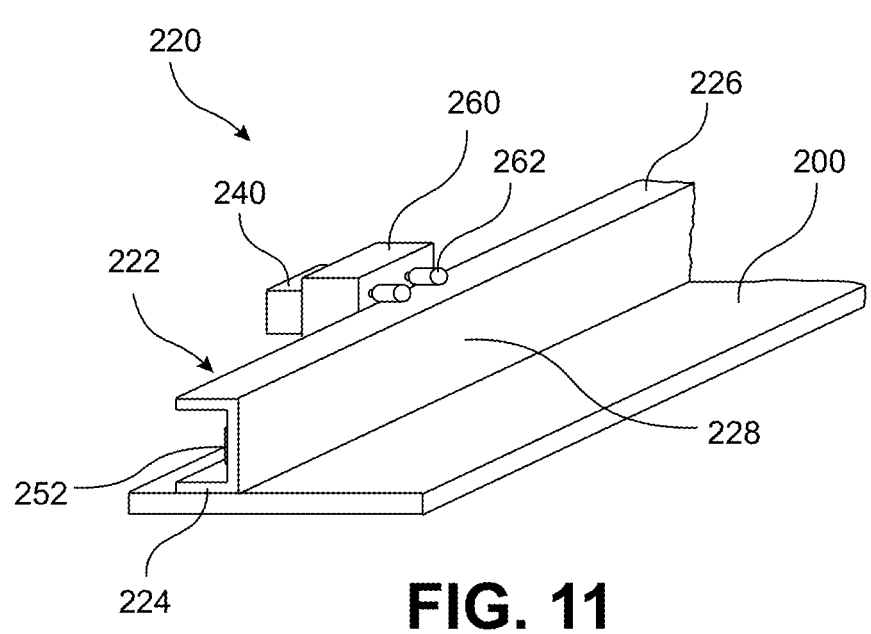
FIG. 11 is a fragmentary perspective view of the positioning mechanism of FIG. 10.

The disclosed position detection system 150 may be used in conjunction with any other suitable motion conversion mechanism configured to convert the rotary motion of the rotor 41 to the linear motion of the corresponding stop mechanism. For example, FIGS. 10 and 11 illustrate a positioning mechanism 220 having a position detection system 250 according to another embodiment of the present invention. The positioning mechanism 220 generally includes a support structure 222, a rotary motor 240, and a carriage 260. Although not illustrated in FIG. 10, the carriage 260 is configured for coupling to a suitable stop mechanism such as the stop mechanism 70 disclosed in FIGS. 1-4. The associated stop mechanism may be coupled to an upper surface of the carriage 260, for example.

The support structure 222 may be formed as an extrusion having a substantially constant cross-section as the support structure 222 extends longitudinally from end to end, thereby simplifying formation of the support structure 222. In the provided embodiment, the support structure 222 is formed from a main body having a substantially constant C-shaped cross-section including a lower horizontal wall 224, an upper horizontal wall 226, and a vertical wall 228. As shown in FIG. 11, the lower horizontal wall 224 may be configured to rest directly on a fixed table 200 of a corresponding miter saw assembly with an outer face of the vertical wall 228 forming a guide surface in a manner wherein the support structure 222 forms a fence of the corresponding miter saw assembly. However, in other embodiments, the support structure 222 may instead be disposed on and coupled to an independently provided fence structure disposed directly on the fixed table 200, as desired.

A motion conversion mechanism of the positioning mechanism 220 may be provided by a plurality of rollers 262 rotatably coupled to the carriage 260 with each of the rollers 262 configured to rollingly engage a corresponding portion of the support structure 222. In the provided example, the carriage 260 includes a pair of the rollers 262 disposed on and engaging an upper surface of the upper horizontal wall 226, a pair of rollers engaging a bottom surface of the upper horizontal wall 226, and a pair of rollers 262 disposed on and engaging the lower horizontal wall 224. However, one skilled in the art should appreciate that any number of the rollers 262 engaging any number of parallel-arranged surfaces may be utilized while still causing the same linear motion in the carriage 260 relative to the support structure 222, as desired. Although not pictured, the carriage 260 and the support structure 222 may further include cooperating structure for restricting the motion of the carriage 260 relative the support structure 222. For example, the carriage 260 may include structure for establishing a sliding relationship relative to the support structure 222 to ensure that the carriage 260 moves linearly in a direction parallel to the longitudinal direction of the support structure 222. Alternatively, the support structure 222 may include tracks or the like for engaging the rollers 262 and limiting the motion thereof, as desired.

The carriage 260 supports the rotary motor 240 and any internal components required for transferring the rotary motion of the rotary motor 240 to one or more of the rollers 262 engaging the support structure 222, such as a suitable gear box, pulley assembly, or the like, as desired. The rotary motor 240 is provided as a stepped motor devoid of an encoder, resolver, or similar sensing device for determining the degree of rotation of the rotary motor 240 in similar fashion to the previously disclosed rotary motor 40. Although not pictured, the carriage 260 may further support an associated controller with a display having the same responsibilities as the controller 80 and display 85 described in reference to the positioning mechanism 20, as desired. In other embodiments, the controller is stationary and in signal communication with the mobile carriage 260.

The position detection system 250 includes a ruler strip 252 disposed on an inner face of the vertical wall 228 and a visual sensor 254 disposed on a face of the carriage 260 facing towards the ruler strip 252. The ruler strip 252 includes a plurality of spaced apart position indicators (not shown) disposed thereon or formed thereon in similar fashion to the ruler strip 152. The position detection system 250 otherwise operates in identical fashion to the position detection system 150 wherein the associated controller monitors the images viewed by the visual sensor 254 when translated relative to the ruler strip 252 to identify if one of the coded position indicators recognizable by the controller is in axial alignment therewith.

Referring back to FIG. 8, the positioning mechanism 220 may be incorporated into the structure of the miter saw assembly 10 to replace the positioning mechanism 20 while remaining within the scope of the present invention. Specifically, the support structure 222 may be disposed on the fixed table 100 at the illustrated position of the housing 22 with the vertical wall 228 of the support structure 222 positioned wherein the outer face thereof forms at least a portion of the guide surface 121 of the fence 120 while the oppositely arranged inner face thereof includes the ruler strip 252 of the position detection system 250. The stop mechanism 70 may be coupled to the carriage 260 in a manner allowing for the stop 75 to be removably positioned adjacent the outer face of the vertical wall 228 and the support surface of the fixed table 100 for engaging a work piece 99. The coupling of the stop mechanism 70 to the carriage 260 may include the first set of the knuckles 77 of the hinge assembly 72 fixedly coupled to the upper surface of the carriage 260 and the second set of the knuckles 78 configured to pivot relative to the first set of the knuckles 77 to move the stop 75 between an operational position for engaging the work piece 99 and a retracted position wherein the stop 75 is spaced from the outer face of the vertical wall 228 and the support surface of the fixed table 100. For example, the stop 75 may be configured to rotate or otherwise move to a position with the stop 75 disposed above the carriage 260, as desired. The use of the positioning mechanism 220 with the remaining structure of the miter saw assembly 10 allows for the support structure 222 to be employed as both the guide surface 121 of the fence 120 and the ruler strip 252 of the position detection system 250, thereby simplifying the construction of the miter saw assembly 10.

In use, the operator of the positioning mechanism 220 may cause linear translation of the carriage 260 relative to the support structure 222 by causing the rotary motor 240 to repeatedly pulse to an adjacent rotational position with the rotational motion generated by the rotary motor 240 transferred to the rollers 262, wherein a known relationship is present between the degree of rotation of the rotary motor 240 and the degree of linear translation of the carriage 260 via the rolling of the rollers 262. If the operator wants to know a position of the carriage 260 and the associated stop mechanism coupled thereto, the operator may then initiate the position detection system 250. The controller causes the carriage 260 to move in a given direction via the pulsing of the rotary motor 240 until one of the coded position indicators is detected by the visual sensor 254 and is communicated to the controller. The controller then knows the position of the carriage 260 relative to the support structure 222, and may further cause movement of the carriage 260 back to the original position of the carriage 260 prior to the initiation of the position detection process. All other processes described as being suitable for use with the positioning mechanism 20 may also be adapted for use with the positioning mechanism 220, as desired, without departing from the scope of the present invention.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A positioning mechanism for positioning a work piece relative to a cutting axis of a cutting tool, the positioning mechanism comprising:
   a stop mechanism having a stop surface configured to engage the work piece, the stop mechanism linearly translatable in a first direction towards or away from the cutting axis;
   a position detection system comprising:
      a ruler strip extending longitudinally in the first direction, the ruler strip including a plurality of position indicators provided thereon with the position indicators spaced apart from each other with respect to the first direction;
      a visual sensor coupled to the stop mechanism and configured to move in unison therewith when the stop mechanism is linearly translated in the first direction, the visual sensor having a viewing axis directed towards the ruler strip, the visual sensor configured to sense each of the position indicators when a corresponding one of the position indicators has a predefined relationship with respect to a viewing range of the visual sensor;
      a controller in signal communication with the visual sensor;
      a rotary motor in signal communication with the controller, wherein the rotary motor is a stepper motor having a selectively rotatable rotor, wherein the rotor is rotatable to a finite number of rotational positions with the rotational positions equally angularly spaced apart, and wherein a selective rotating of the rotor by the controller includes pulsing the rotor to an adjacent rotational position of the finite number of rotational positions, wherein the controller and the rotary motor are not associated with an encoder for providing feedback regarding rotation of the rotor; and
      a motion conversion mechanism configured to transform rotary motion of the rotor to a corresponding linear motion of the stop mechanism and the visual sensor with respect to the first direction, wherein the controller is configured to repeatedly pulse the rotor in a first rotational direction starting from an initial rotational position of the rotor, wherein the repeated pulsing of the rotor in the first rotational direction occurs until one of the position indicators is sensed by the visual sensor during motion of the visual sensor with respect to the first direction.

2. The positioning mechanism of claim 1, wherein each of the position indicators communicates information regarding a position of the corresponding one of the position indicators with respect to the first direction.

3. The positioning mechanism of claim 2, wherein each of the position indicators is provided to include a visual pattern to differentiate each of the position indicators from one another.

4. The positioning mechanism of claim 3, wherein each of the position indicators is provided as a QArt code pattern.

5. The positioning mechanism of claim 1, wherein the position indicators are equally spaced from each other with respect to the first direction.

6. The positioning mechanism of claim 1, wherein at least one of the position indicators is disposed to correspond to a desired position of the stop mechanism when the visual sensor senses the at least one of the position indicators.

7. The positioning mechanism of claim 1, wherein the predefined relationship includes the corresponding one of the position indicators being centered with respect to the viewing range of the visual sensor.

8. The positioning mechanism of claim 1, wherein the viewing axis of the visual sensor is arranged perpendicular to the first direction.

9. The positioning mechanism of claim 1, wherein the ruler strip is provided on a planar surface arranged parallel to the first direction.

10. The positioning mechanism of claim 9, wherein the ruler strip is provided on a structure acting as a guide for positioning the work piece relative to the cutting axis of the cutting tool.

11. The positioning mechanism of claim 1, wherein the controller is configured to analyze the corresponding one of the position indicators being instantaneously sensed to determine which among the plurality of the position indicators is being instantaneously sensed.

12. The positioning mechanism of claim 11, wherein the controller is configured to correlate a determination of which of the plurality of the position indicators is instantaneously being sensed to a position of the stop mechanism with respect to the first direction.

13. The positioning mechanism of claim 1, wherein the controller is configured to count the number of pulses necessary to pulse the rotor in the first rotational direction from the initial position thereof to a position of the rotor corresponding to the sensing of the one of the position indicators.

14. The positioning mechanism of claim 1, wherein the motion conversion mechanism is one of a conveyer system, a linear screw drive, or a roller assembly.

* * * * *